(12) United States Patent
Vestberg et al.

(10) Patent No.: US 8,394,893 B2
(45) Date of Patent: Mar. 12, 2013

(54) HETEROPHASIC POLYMER COMPOSITION AND PROCESS FOR ITS PREPARATION

(75) Inventors: Torwald Vestberg, Porvoo (FI); Bo Malm, Espoo (FI); Pirjo Jääskeläinen, Porvoo (FI)

(73) Assignee: Borealis Polymers Oy, Porvoo (FI)

( * ) Notice: Subject to any disclaimer, the term of this patent is extended or adjusted under 35 U.S.C. 154(b) by 275 days.

(21) Appl. No.: 11/813,834

(22) PCT Filed: Jan. 12, 2006

(86) PCT No.: PCT/EP2006/000227
§ 371 (c)(1),
(2), (4) Date: Dec. 4, 2007

(87) PCT Pub. No.: WO2006/074930
PCT Pub. Date: Jul. 20, 2006

(65) Prior Publication Data
US 2008/0207835 A1    Aug. 28, 2008

(30) Foreign Application Priority Data
Jan. 14, 2005 (EP) .................................. 05000737

(51) Int. Cl.
*C08L 23/00* (2006.01)
*C08L 23/04* (2006.01)
*C08L 23/10* (2006.01)
*C08L 23/16* (2006.01)

(52) U.S. Cl. ........................ 525/240; 525/191
(58) Field of Classification Search .................. 525/191, 525/192, 240
See application file for complete search history.

(56) References Cited

U.S. PATENT DOCUMENTS 6,342,564 B1 * 1/2002 Pitkanen et al. .............. 525/191

FOREIGN PATENT DOCUMENTS

| EP | 1270651 | 1/2003 |
|---|---|---|
| EP | 0991719 | 12/2003 |
| EP | 1428853 | 6/2004 |
| WO | 9212182 | 7/1992 |
| WO | 9219653 | 11/1992 |
| WO | 9219658 | 11/1992 |
| WO | 9924478 | 5/1999 |
| WO | 9924479 | 5/1999 |
| WO | 9933843 | 7/1999 |
| WO | WO-02/072693 A1 * | 9/2002 |
| WO | 03000754 | 1/2003 |
| WO | 03000757 | 1/2003 |
| WO | WO-03/002625 A1 * | 1/2003 |
| WO | 03037981 | 5/2003 |

* cited by examiner

*Primary Examiner* — Irina S Zemel
*Assistant Examiner* — Jeffrey Lenihan
(74) *Attorney, Agent, or Firm* — Roberts Mlotkowski Safran & Cole, P.C.

(57) ABSTRACT

The invention relates to a heterophasic alpha-olefÊn random copolymer composition with a melting temperature (Tm) of at least 130° C. and a flexural modulus of not higher than 1000 MPa5 whereby the inventive composition comprises an alpha-olefin random copolymer component (A) of at least two alpha-olefÊn (co)polymer fractions (i) and (ii) having a different comonomer content, whereby at least one of the fractions is an alpha-olefÊn random copolymer, and a rubber component (B).

25 Claims, 1 Drawing Sheet

HETEROPHASIC POLYMER COMPOSITION AND PROCESS FOR ITS PREPARATION

Figure 1:
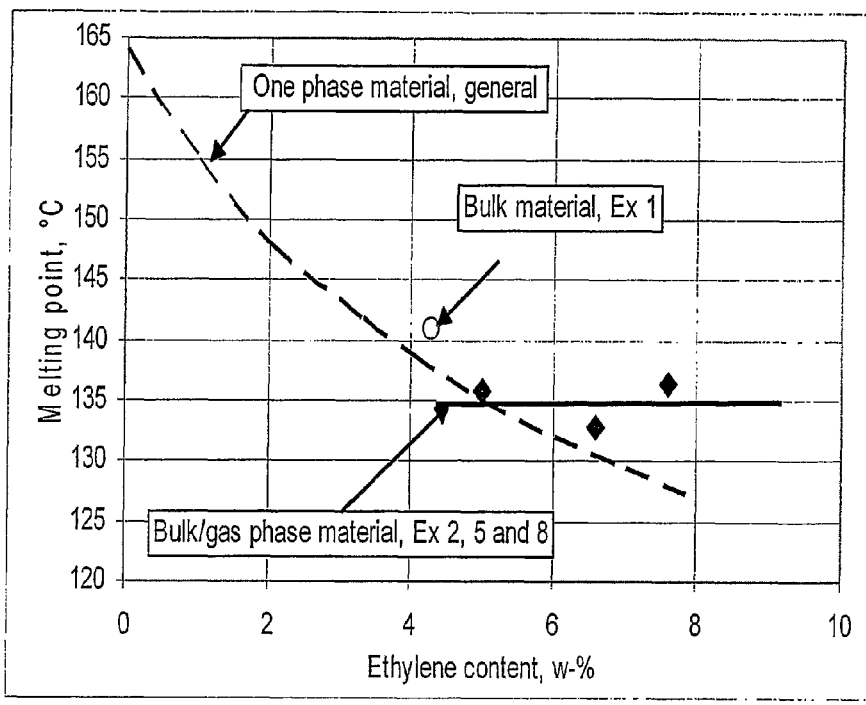

The invention relates to a heterophasic alpha-olefin random copolymer composition having a low stiffness and an improved thermal behaviour. Moreover, the present invention is related to the process for the manufacture of the new polymer composition as well as its use.

BACKGROUND ART

Polymers are increasingly used in different demanding applications. At the same time there is a continuous seek for tailored polymers which meet the requirements of these applications. The demands can be challenging, since many polymer properties are directly or indirectly interrelated. For instance, it has been problematic to develop polymers with the combination of low stiffness together with high melting temperature. E.g. EP 991 719 of the Applicant discloses propylene polymers having tensile modulus of 420 MPa or less. However, there is still need to control or to improve the thermal behaviour of the polymer together with the low stiffness.

SUMMARY OF THE INVENTION

Hence, the object of the present invention is to provide further heterophasic al-pha-olefin random copolymer compositions which broaden the product window of polymers for wide variety of end applications.

Another object of the present invention is to provide a process for obtaining further alternatives for the polymer compositions.

It has surprisingly been found that a heterophasic alpha-olefin random copolymer composition having a high melting temperature ($T_m$) and at the same time a low flexural modulus, i.e. low stiffness, can be obtained with a copolymer composition as tailored according to the invention.

Accordingly, the heterophasic alpha-olefin random copolymer composition of the invention comprises
   an alpha-olefin random copolymer component (A) of at least two alpha-olefin (co)polymer fractions (i) and (ii), and
   a rubber component (B), whereby the comonomer content between the alpha-olefin polymer fractions (i) and (ii) is different and whereby at least one of fractions (i) and (ii) is a random copolymer. The other of said two fractions (i) and (ii) can be a homopolymer or a copolymer. This tailored combination of components (A) and (B) provides a heterophasic alpha-olefin random copolymer composition having a melting temperature ($T_m$) of at least 130° C. and a flexural modulus of not higher than 1000 MPa.

Unexpectedly, it has been found that the melting temperature can be controlled with the different comonomer content between fractions (i) and (ii), so that said combination of high melting temperature ($T_m$) and, at the same time, low flexural modulus, i.e. low stiffness, can be achieved. Also unexpectedly, rubber component (B) can be incorporated to the random copolymer component (A) of the invention and still the improved thermal behaviour together with the low stiffness of the final composition can be maintained.

The present invention thus provides feasible means to control and adjust the combination of low stiffness (modulus) and thermal behaviour.

Preferably, with the present invention it is also possible to obtain heterophasic alpha-olefin copolymers i.a. with good impact strength at low temperatures and, optionally, advantageous optical or sealing properties or both, depending on the needs of the end use application.

The "heterophasic alpha-olefin random copolymer composition" is referred herein below also shortly as "random-heterophasic copolymer".

By the term "random copolymer" is meant herein that the comonomer in said copolymer is distributed randomly, i.e. by statistical insertion of the comonomer units, within the copolymer chain. Said term "random" copolymer is generally known and used in the art.

The "random copolymer component (A)" forms "matrix (A)" of the random-heterophasic copolymer. Both terms are used herein below.

The term "rubber component" is well known in the field and means herein an elastomeric alpha-olefin copolymer component (B) of the random-heterophasic copolymer produced separately and dispersed in matrix (A). Preferably, said rubber component (B) is produced separately in a multistage process in the presence of matrix (A) as described herein below. Typically rubber component (B) is thus a copolymer of at least two alpha-olefins and is mainly in amorphous (=xylene soluble, XS) form. Rubber component (B) is suitably an elastomeric propylene copolymer with one or more alpha-olefin comonomers, preferably at least with ethylene and optionally with one or more higher alpha-olefins.

As known, also matrix (A) comprises an amorphous (=xylene soluble, XS) part. The amount of said amorphous part of matrix (A) can be increased by increasing the comonomer content of matrix (A). Accordingly, the amorphous part of matrix (A) and the amorphous rubber component (B) are dispersed as an "amorphous phase" in matrix (A).

SHORT DESCRIPTION OF THE FIGURES

Figure 2:
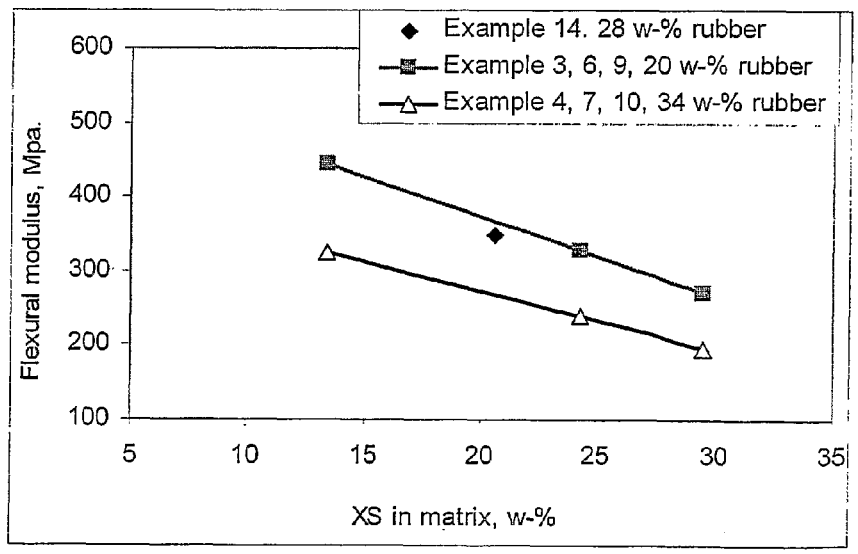

FIG. 1 is a plot showing ethylene content in matrix (A) versus melting point for polymers of examples 1, 2, 5 and 8 of the invention; and FIG. 2 shows a plot of stiffness versus xylene solubles in matrix composition of the polymers of examples 3, 4, 6, 7, 9, 10 and 14 of the present invention.

DESCRIPTION OF THE INVENTION

Preferably, the present invention provides a heterophasic alpha-olefin random copolymer composition comprising
(a) an alpha-olefin random copolymer component (A) which comprises at least one fraction (i) comprising a homopolymer of an alpha-olefin or a copolymer of an alpha-olefin with one or more alpha-olefin comonomers, and at least one fraction (ii) comprising a copolymer of an alpha-olefin with one or more alpha-olefin comonomers, and
(b) a rubber component (B) dispersed in the random copolymer component (A), whereby
   the amount (wt %) of comonomer in fraction (ii) is higher than the amount (wt %) of comonomer in fraction (i), and wherein
   the heterophasic alpha-olefin random copolymer composition has a melting temperature ($T_m$) of at least 130° C. and a flexural modulus of not higher than 1000 MPa.

Accordingly, fraction (i) can either comprise a homopolymer or a random copolymer as defined above, or a mixture of a homo and/or (co)polymer(s), provided that, if there is any comonomer present in fraction (i), the amount (wt %) of the comonomer in fraction (i) is lower than the amount (wt %) of the comonomer in fraction (ii), and thus also lower than the total amount (wt %), i.e. the total comonomer content (wt %), of matrix (A).

It has been surprisingly found that the melting temperature ($T_m$) of the random-heterophasic copolymer is controlled and determined with fraction (i) of matrix (A): It is believed that fraction (i) of the homo or random copolymer with a lower comonomer content determines or contributes to the final melting temperature of the random-heterophasic copolymer composition, even though the second random copolymer fraction (ii), and as a result matrix (A) of fractions (i) and (ii), has higher comonomer content than fraction (i). The low flexural modulus, i.e. decreased stiffness, is in turn due to the total comonomer content of matrix (A), which decreased stiffness can be advantageously tailored further with rubber component (B).

Furthermore, within the present concept it is possible to vary one or both of the properties of said combination, ie. either to decrease the stiffness further or to increase the $T_m$ further, or both to decrease the stiffness and increase the $T_m$ further, depending on the desired end application.

It is understood herein that the values of $T_m$ of more than 130° C. and flexural modulus of less than 1000 MPa of the random-heterophasic copolymer of the invention can be obtained and controlled at least with the comonomer contents of fractions (i) and (ii) preferably in the presence of rubber component (B) as defined above.

Therefore, as a further aspect the invention provides also a use of a random copolymer component (A), which comprises at least two alpha-olefin (co)polymer fractions (i) and (ii), wherein at least one of fractions (i) and (ii) is an alpha-olefin copolymer and wherein fractions (i) and (ii) have different comonomer contents (wt %), for controlling and adjusting, i.e. tailoring, the combination of thermal behaviour and stiffness of the random copolymer component (A) by means of a different comonomer content between the two fractions (i) and (ii). Preferably, fraction (ii) has higher comonomer content than fraction (i) as defined above. In one preferable embodiment of said use the comonomer difference between said fractions (i) and (ii) is chosen to obtain a flexural modulus less than 1000 MPa and $T_m$ of more than 130° C. of the random copolymer component (A). In another embodiment of said use a rubber component (B) is incorporated into said matrix (A) and, optionally, the stiffness is further controlled by said rubber component (B). More preferably, the random-heterophasic copolymer of the invention as defined above or below is used for the tailoring of said property combination.

If desired, $T_m$ and stiffness may be tailored further within the limits of the invention by means of other features, e.g. by adding further polymer compounds or additives in a manner known in the field.

Furthermore, the heterophasic-random copolymer composition of the invention may preferably also exhibit a good impact strength at low temperatures. Moreover, rubber component (B) provides highly feasible means for further tailoring, e.g. further increasing, the impact strength at low temperatures, if desired.

In addition to said impact strength at low temperatures, the invention enables a wide flexibility in other properties of the random-heterophasic copolymer to meet the demands in various end applications. As an example e.g. optical properties and sealing properties or both can be varied within the invention. The tailoring can be effected e.g. by adjusting the crystalline and amorphous part of the random-heterophasic copolymer in a known manner to optimize the desired optical properties. As an example of the means for tailoring the copolymer composition include one or more of the following: the type and the number of the comonomer(s) used in matrix (A) and in rubber component (B); the total amount of the comonomer in matrix (A); the amount of the comonomer in each of fractions (i) and (ii) within the limits of the invention; the amount of the comonomer in rubber component (B); the weight ratio between matrix (A) and rubber component (B); as well as the weight ratio, i.e. split, between fractions (i) and (ii).

Accordingly, matrix (A) of the random-heterophasic copolymer is multimodal with respect to the comonomer distribution due to the difference in the comonomer contents between fractions (i) and (ii). The "multimodal comonomer distribution" is further defined in the under "definitions and determination methods" below.

The following definitions and specific ranges represent either individually or in any combinations some of the feasible or preferable general subgroups or embodiments of the random-heterophasic polymer of the invention:

Matrix (A) can be unimodal or multimodal with respect to the molecular weight distribution (MWD). The "multimodal MWD" is further defined under the experimental part below and includes the bimodal matrix (A). The two fractions (i) and (ii) provide also a feasible means to obtain said "multimodal, e.g. bimodal, MWD". Furthermore, the MWD can be narrow or broad in a manner well known in the art.

In one embodiment, fraction (i) of matrix (A) comprises a homopolymer component, and preferably is comprised of a homopolymer component of one alpha-olefin. This embodiment is referred herein also as H/R-matrix (A). Preferably, in H/R-matrix (A) fraction (i) is a homopolymer propylene, and fraction (ii) is a random copolymer of propylene with one or more alpha-olefins.

In a second embodiment fraction (i) of matrix (A) comprises a random copolymer(s) of an alpha-olefin(s) with at least one alpha-olefin comonomer, and preferably is comprised of a copolymer of one alpha-olefin with at least one alpha-olefin comonomer. This embodiment is referred herein also as R/R-matrix (A). Preferably, in R/R-matrix (A) fraction (i) is a random copolymer of propylene with one or more alpha-olefins and fraction (ii) is a copolymer of propylene with one or more alpha-olefins.

Similarly, fraction (ii) of matrix (A) comprises a random copolymer(s) of an al-pha-olefin(s) with at least one alpha-olefin comonomer, and preferably is comprised of a copolymer of one alpha-olefin with at least one alpha-olefin comonomer, such as a copolymer of propylene with one or more alpha-olefins.

Preferably, matrix (A) is comprised of fractions (i) and (ii) and, optionally, of a prepolymer fraction in a conventional manner. Alternatively, as indicated above, fractions (i) and (ii) may comprise further (co)polymer components or matrix (A) may comprise further fractions within the limits of the invention.

The melting temperature ($T_m$) of the heterophasic polymer composition is at least 130° C., preferably at least 131° C., more preferably at least 132° C., still more preferably at least 133° C. On the other hand, the melting temperature is typically not higher than 170° C. The present $T_m$ describes the improved thermal behaviour.

Preferably, also fraction (i) of matrix (A) has a melting temperature of at least 130° C., preferably of at least 131° C., e.g. of at least 133° C. Furthermore, fraction (i) of matrix (A) has suitably a melting temperature of not higher than 170° C. In practice, the melting temperature of fraction (i) of matrix (A) is essentially in the same level as the melting temperature of the random-heterophasic copolymer, and if $T_m$ of fraction (i) is higher, then it is typically not higher than up to 15° C. of the $T_m$ of the final random-heterophasic copolymer, the $T_m$ of fraction (i) being e.g. between 0 to 12° C., suitably between 1 to 8° C., higher.

Typically, fraction (i) of matrix (A) has thus a higher melting temperature than fraction (ii) of matrix (A) and fraction (i) contributes to the $T_m$ of matrix (A) and to the $T_m$ of the final random-heterophasic copolymer as well.

In one embodiment (i), the melting temperature ($T_m$) of the random-heterophasic copolymer is of at least 130° C., preferably of at least 132° C. Preferably, the melting temperature ($T_m$) of said random-heterophasic copolymer may then not be higher than 165° C., suitably not higher than 155° C. In this embodiment said $T_m$ may e.g. range between 130 to 165° C., preferably it ranges from 132 to 155° C. In this embodiment (i) matrix is preferably a R/R-matrix (A).

In another embodiment (ii), the melting temperature ($T_m$) of the random-heterophasic copolymer is of at least 130° C., preferably of at least 135° C. Said melting temperature ($T_m$) may not be higher than 170° C. Preferably, said melting temperature ($T_m$) ranges from 135 to 160° C. Preferably, also in this embodiment (ii) matrix is a R/R-matrix (A).

In still another preferred embodiment (iii), the melting temperature ($T_m$) of the random-heterophasic copolymer may be of at least 130° C., preferably of at least 135° C., suitably of at least 140° C. and in some cases even of at least 145° C. may be desired. In this embodiment said $T_m$ is preferably not higher than 170° C., such as not higher than 165° C. The melting temperature ($T_m$) of the random-heterophasic copolymer may thus range e.g. from 145 to 165° C. Preferably, in this embodiment (iii) matrix is a H/R-matrix (A).

The flexural modulus describes the stiffness (softeness) of the random-heterophasic copolymer. The flexural modulus of the random-heterophasic co-polymer is thus not higher than 1000 MPa, typically not higher than 990 MPa, preferably not higher than 900 MPa, suitably not higher than 800 MPa. The lower limit is not critical, however it may be preferable that the flexural modulus is not lower than 100 MPa, preferably not lower than 300 MPa, more preferably not lower than 400 MPa. Accordingly, the flexural modulus of the random-heterophasic copolymer preferably ranges from 100 to 1000, e.g. to 990 or to 800 MPa.

In one embodiment (iv) a considerably low stiffness may be desired, whereby the flexural modulus of the random-heterophasic copolymer is not higher than 600 MPa, preferably not higher than 500 MPa, suitably not higher than 450 MPa, and even may not be higher than 400 MPa. In this embodiment (iv), the heterophasic polymer composition may have a flexural modulus e.g. in the range of 100 to 600 MPa, suitably of 100 to 500 MPa, preferably of 100 to 450 MPa, and may even be of 150 to 400 MPa. This embodiment (iv) may preferably be combined with the embodiment (i) above, so that the flexural modulus is as given in this para-graph, and the melting temperature of the random-heterophasic copolymer is at least 130° C., suitably of at least 132° C., and preferably not higher than 165° C., e.g. not higher than 155° C. For instance, matrix (A) is a R/R matrix (A) and the random-heterophasic copolymer thereof has a $T_m$ in a range of 130 to 165° C., preferably in the range of 132 to 155° C.

In another embodiment (v), the flexural modulus and the melting temperature of the random-heterophasic copolymer may be: the flexural modulus is not higher than 600 MPa, preferably not higher than 500 MPa, suitably not higher than 450 MPa, and even may not be higher than 400 MPa. Typically, the flexural modulus may range from 100 to 600 MPa, such as from 100 to 500 MPa, preferably from 100 to 450 MPa, e.g. from. 150 to 400 MPa. This embodiment (v) may preferably be combined with the embodiment (ii) above, so that the flexural modulus is as given in this paragraph, and the melting temperature of the random-heterophasic copolymer is at least 130° C., preferably at least 135° C. Suitably, the melting temperature ($T_m$) shall not be higher than 170° C., preferably not higher than 160° C. $T_m$ may range e.g. between 135 to 160° C. This embodiment is particularly suitable for an R/R-matrix (A).

In further embodiment (vi), the flexural modulus of the random-heterophasic copolymer is lower than 350 MPa and preferably the melting temperature ($T_m$) of at least 130° C., suitably of at least 132° C. The melting temperature ($T_m$) of this embodiment may not be higher than 165° C., preferably not higher than 155° C. For instance, matrix (A) is typically an R/R-matrix (A) and the melting temperature for this embodiment ranges from 130 to 165° C., preferably from 132 to 155° C.

In yet another embodiment (vii), the flexural modulus of the random-heterophasic copolymer is lower than 1000 MPa, typically may range between 300 to 990 MPa, preferably between 300 to 900 MPa, suitably between 400 to 800 MPa. In this embodiment (vii) the melting temperature ($T_m$) of the random-heterophasic copolymer varies typically in the range of 130 to 170° C., preferably in the range of 140 to 170° C., such as in the range of 140 to 160° C. Preferably, matrix (A) is a H/R-matrix (A).

In still another embodiment (viii), the flexural modulus of the random-heterophasic copolymer is not higher than 1000 MPa, and is typically in the range of 300 to 990 MPa, preferably in the range of 300 to 900 MPa, such as in the range of 400 to 900 MPa, and may even be in the range of 400 to 800 MPa. In this embodiment (viii) the melting temperature of the random-heterophasic co-polymer is at least 130° C., preferably of at least 135° C., suitably of at least 140° C., such as at least 145° C. The melting temperature ($T_m$) in this embodiment (viii) is typically not higher than 170° C., preferably not higher than 165° C., an may be e.g. in a range of 145 to 165° C. Preferably, matrix (A) is a H/R-matrix (A).

As defined above, the comonomer contents are different in fraction (i) and (ii) of matrix (A). Said difference is defined herein as the difference between the amount (wt %) of comonomer in fraction (i) and the total amount (wt %) of the comonomer in matrix (A), whereby said comonomer content (wt %) of fraction (i) is lower than that of matrix (A). The "difference in comonomer content between fraction (i) and matrix (A)" (in wt %) is thus calculated by subtracting the "comonomer content of fraction (i)" (in wt %) from the "total comonomer content of matrix (A)" (in wt %), i.e.:

"difference in comonomer content between fraction (i) and matrix (A)"="total comonomer content of matrix (A)"—"comonomer content of fraction (i)".

E.g. in case of a multistage polymerisation process of the random-heterophasic copolymer as further described below, the comonomer content of fraction (i) or (ii), which is prepared first, preferably fraction (i), and matrix (A) can be deter-mined by Fourier transform infrared spectroscopy (FTIR) in a known manner, and the secondly prepared fraction (i) or (ii), preferably fraction (ii), can be calculated from the measured values of the firstly prepared fraction and matrix (A) taking account the weight ratios, i.e. split, of fractions (i) and (ii). Similarly the comonomer content of rubber (B) can be calculated from the measured (by FTIR) comonomer content of matrix (A) and the final random-heterophasic copolymer taking account the weight ratios of matrix (A) and rubber (B).

Typically, the difference in the comonomer content between fraction (i) and matrix (A) is at least 0.5 wt %, preferably at least 1 wt %. The difference in said comonomer content is e.g. up to 15 wt %, suitably up to 10 wt %, such as 8 wt %, for example up to 6 wt %.

In one embodiment (I), preferably in case of R/R-matrix (A) said difference in the comonomer content between matrix (A) and random copolymer fraction (i) is 0.5 wt %, e.g. at least 1 wt %, preferably at least 2 wt % or higher, e.g. may be up to 6 wt %, e.g. up to 4 wt %.

In another embodiment (II), preferably in case of H/R-matrix, higher difference may be desired, whereby the difference in said comonomer content between matrix (A) and the homopolymer fraction (i) may vary in broader range, being e.g. at least 2 wt %, typically at least 3 wt %, preferably at least 4 wt %, even at least 5 wt %. The upper limit in said difference may be up to 10 wt %, for example up to 8 wt %, in some embodiments e.g. in the range of 3 to 6 wt %.

Furthermore, the comonomer content in matrix (A), i.e. the total amount of the comonomer in matrix (A), is typically at least 1 wt %, and may be e.g. up to 13 wt %, suitably between 2 to 12 wt %, e.g. between 3 to 12 wt % or even between 5 to 12 wt %.

In one embodiment (ix) said total comonomer content in matrix (A) is up to 13 wt %, e.g. in a range of 4 to 12 wt %, preferably in a range of 6 to 12 wt %, more preferably in a range of 7 to 10 wt %.

In another embodiment (x), the total comonomer content in matrix (A) may be up to 12 wt %, preferably shall range from between 1 to 12 wt % and suitably in the range of 2 to 10 wt %.

Furthermore, the homo- or random copolymer of fraction (i) can have a comonomer content of up to 15 wt %, suitably of up to 10 wt %, depending i.a. on the type of matrix (A) (H/R- or R/R-) and on the $T_m$ and stiffness levels desired. Thus in one embodiment (xi) the amount of comonomer in fraction (i) may varied e.g. within any of the ranges: 0 to 1, 0 to 2, 0 to 3, 0 to 4, 0 to 5, 0 to 6, 0 to 7, 0 to 8, 0 to 9 or even up to 10 wt %, such as 0 to 6 wt %.

It may be preferable for some end applications, that the comonomer content of fraction (i) in R/R-matrix (A) may vary between 1.5 to 6 wt %, such as 1.5 to 4 wt %. Alternatively, for some other end applications comonomer content of fraction (i) of 4 to 6 wt % may be desired.

One feasible range of the amount of comonomer in fraction (i) for adjusting the $T_m$ within the limits of the invention may vary from 0 to 10 wt %, preferably from 0 to 6 wt %, but is not limited thereto.

It is in turn, preferable that the copolymer of fraction (ii) has a comonomer content of up to 20 wt %.

In one embodiment (xii) the amount of the comonomer in fraction (ii) is not lower than 2 wt %, more preferably not lower than 3 wt %, e.g. between 3 to 15 wt %, for some end applications even below 10 wt % may be desirable.

In another embodiment (xiii) the copolymer of fraction (ii) has a comonomer content in the range of 2 to 20 wt %, preferably in the range of 5 to 20 wt %, e.g. in the range of 6 to 17 wt %.

In a further embodiment (xiv) the amount of the comonomer in fraction (ii) is not lower than 10 wt % and preferably in the range of 10 to 15 wt %.

Also the amount of the comonomer in rubber component (B) and the amount of rubber (B) in the random-heterophasic copolymer can be varied within the limits of the invention to adjust i.a. one or more of the stiffness, impact strength at low temperatures and optical properties of the final random-heterophasic copolymer to the level desirable of the end application in question.

Typically, the comonomer content of rubber component (B) is in the range of 10 to 60 wt %, more preferably in the range of 15 to 50 wt %.

In one embodiment (xv), the amount of comonomer in rubber component (B) is in a range of 15 to 40 wt %.

In another embodiment (xvi), rubber component (B) has a comonomer content in the range of 20 to 40, preferably in the range of 20 to 35 wt %.

As a preferable embodiment of the invention matrix (A) comprises a propylene homopolymer or propylene random copolymer as fraction (i) and/or propylene random copolymer as fraction (ii). Still more preferably, the random copolymer in fraction (i) and/or in fraction (ii) is a random copolymer of propylene and one or more alpha-olefins.

The term "alpha-olefins" includes herein ethylene and higher alpha-olefins and may be selected e.g. from the group consisting of ethylene, $C_4$ alpha-olefin, $C_5$ alpha-olefin, $C_6$ alpha-olefin, $C_7$ alpha-olefin, $C_8$ alpha-olefin, $C_9$ alpha-olefin, $C_{10}$ alpha-olefin, $C_1$ alpha-olefin, $C_{12}$ alpha-olefin. Preferably, the comonomers are selected from the group consisting of ethylene, 1-butene, 1-pentene, 4-methyl-1-pentene, 1-hexene, 1-heptene or 1-octene. The preferred comonomer is ethylene.

Preferably, rubber component (B) is a propylene copolymer, more preferably a copolymer of propylene and another alpha-olefin as defined above. In particular, rubber (B) is a copolymer of propylene with ethylene and, optionally, with another alpha-olefin. In one embodiment, rubber (B) is a copolymer of propylene and ethylene.

Accordingly, as a further embodiment (1) the invention provides a random-heterophasic propylene copolymer comprises
(a) a propylene random copolymer component (A) which comprises at least one fraction (i) comprising a propylene homopolymer or a propylene copolymer with one or more alpha-olefin comonomers and at least one fraction (ii) comprising a propylene copolymer with one or more alpha-olefin co-monomers, and
(b) a rubber component (B) of a propylene copolymer with one or more alpha-olefin comonomers, dispersed in the random copolymer component (A), whereby
the amount of comonomer in fraction (ii) is higher than the amount of co-monomer in fraction (i), and wherein
the random-heterophasic copolymer has a melting temperature ($T_m$) of at least 130° C. and a flexural modulus of not higher than 1000 MPa.

The above defined options and subgroups for the comonomer content in fraction (i), fraction (ii) and matrix (A) apply particularly suitably for the polypropylene random copolymer component (1).

The split, i.e. the weight ratio, between fraction (i) and (ii) in matrix (A) is preferably 30:70 to 70:30, more preferably between 40:60 to 60:40.

Moreover, the amount of matrix (A) in the random-heterophasic copolymer may be at least 30 wt %, suitably at least 40 wt %, and preferably at least 50 wt %. Typically, the amount of matrix (A) in the random-heterophasic copolymer ranges from 60 to 90 wt %, more preferably ranges from 70 to 90 wt %, for some end applications, however, range from 60 to 85 wt % may be desired.

Accordingly, the amount of rubber component (B) in the random-heterophasic copolymer may thus be up to 70 wt %, preferably up to 60 wt % and more preferably up to 50 wt % depending on the property combination desired for the end application.

Thus in one embodiment (xvii) rubber (B) in the random-heterophasic copolymer may range between 5 to 70 wt %, preferably between 5 to 40 wt %, more preferably in the range of 5 to 30 wt %, and even 10 to 30 wt %.

In another embodiment (xviii), the amount of rubber (B) in said random-heterophasic copolymer is in the range of 10 to 50 wt %, preferably in the range of 15 to 40 wt %.

Preferably the amount of matrix (A) in the total random-heterophasic copolymer is at least 30 wt % and the amount of rubber (B) is not higher than 70 wt %.

In the present invention, the random-heterophasic copolymer may have an $MFR_2$ (measured according to ISO 1133) of 0.01 to 500 g/10 min, preferably in the range of 0.1 to 100 g/10 min, and more preferably in a range of 1 to 50 g/10 min. Preferably, the $MFR_2$ of fraction (i) of matrix (A) is lower than the $MFR_2$ of fraction (ii), i.e. fraction (i) has the higher molecular weight than fraction (ii), or, alternatively, vice versa.

The falling weight impact (measured according to ISO 6603-2), which describes the ductile behaviour is preferably down to (−20)° C.

Accordingly, the xylene solubles (XS, wt %, as defined below under definitions and determination methods) of the random-heterophasic copolymer may be up to 60 wt %. Moreover, the xylene solubles in fraction (i) of matrix (A) may be up to 15 wt %, preferably in the range of 0.5 to 15 wt %. In turn, the xylene solubles in fraction (ii) of matrix (A) may be up to 70 wt %, e.g. in the range of 3 to 70 wt %.

The xylene solubles of matrix (A), which is preferably comprised of fractions (i) and (ii) together, may be up to 50 wt %, e.g. in a range of 3 to 50 wt %.

The xylene solubles in rubber component (B) may be up to 100 wt %, e.g. 10 to 100 wt %, preferably in a range of 50 to 100 wt %.

In one embodiment (xix), the xylene solubles (XS) in fraction (i) of matrix (A) are in a range of 3 to 15 wt %, preferably 4 to 13 wt %, whereas the xylene solubles (XS) in fraction (ii) of matrix (A) are in a range of 10 to 70 wt %, preferably in a range of 30 to 70 wt %.

It a further embodiment (xx) the xylene solubles (XS) in matrix (A), which is preferably comprised of fractions (i) and (ii), are in a range of 4 to 50 wt %, preferably in a range of 15 to 40 wt %.

Moreover, in one embodiment (xxi), the xylene solubles (XS) in rubber component (B) may be in the range of 70 to 100 wt %, preferably in the range of 80 to 100 wt %.

In another embodiment (xxii), the random-heterophasic copolymer may have xylene solubles (XS) in the range of 20 to 70 wt %, preferably 30 to 55 wt %.

In a preferable embodiment, the random-heterophasic copolymer is any combination of embodiments (xx), (xxi) and (xxii).

The intrinsic viscosity of the amorphous part (IV/AM) of the random-heterophasic copolymer may be up to 5 dl/g, preferably 1 to 4 dl/g, preferably 1 to 2 dl/g, such as 1 to 1.5 dl/g. And for some end applications embodiments IV/AM of 1 to 3 dl/g may be desired.

The matrix (A) and/or the random-heterophasic copolymer of the invention may be produced by blending at least part of the components in-situ during the polymerisation process thereof or, alternatively, by blending mechanically one or more of the separately produced components.

Preferably, matrix (A) and the random-heterophasic copolymer of the invention is produced by in-situ blending in a multistage polymerisation process, also called in-situ process. Matrix (A) may be produced first as a multistage process, wherein fractions thereof are produced in two or more reactors which may be the same or different and, optionally, in same or different the polymerisation conditions, or, alternatively, in one reactor by changing the catalyst and/or polymerisation conditions. Furthermore, fractions (i) and (ii) of matrix (A) may be produced in any order, preferably in different reactors.

In a preferable embodiment, fraction (i) is produced first in a first reactor and then fraction (ii) is produced in a subsequent reactor in the presence of fraction (i).

If desired the polymerisation process may include a pre-polymerisation step in a manner known in the field.

Without limiting the invention to any process, rubber component (B) may preferably be produced as a further process step after the formation of matrix (A) in the same multistage process system as matrix (A). Accordingly, after the formation of matrix (A), rubber component (B) is preferably produced in the subsequent one or more reactor(s), preferably at least in one gas reactor, in the presence of matrix (A). Such rubber processes are known in the field.

Preferably, fractions (i) and (ii) of matrix (A) as well as rubber (B) may be produced using a different or the same polymerisation method including slurry, bulk, solution and gas phase polymerisation methods.

Preferably, fraction (i) of matrix (A) is formed in a slurry process, in solution or as bulk polymerisation, preferably as bulk polymerisation. Such process is preferably carried out in a loop reactor.

Fraction (ii) of matrix (A) is preferably performed in a first gas phase reactor, whereas rubber (B) is typically formed in one or more subsequent reactor, e.g. in second or further subsequent gas phase reactor(s).

Accordingly, it is preferred that the random-heterophasic copolymer is produced in an in-situ process, more preferably, fraction (i) of matrix (A) is produced in a loop reactor, whereas fraction (ii) of matrix (A) is produced in a subsequent first gas phase reactor in the presence of fraction (i) and rubber (B) is then produced in a subsequent one or more gas phase reactors, preferably in the presence of fraction (i) and (ii).

Such process is preferably effected in a "loop"—"first gas phase"—"second or further rubber gas phase"—multistage reactor system, preferably such as developed by Borealis A/S, Denmark, and known as BORSTAR® technology. Such process is known and described i.a. in WO92/12182.

Alternatively, part of the components of the random-heterophasic copolymer may be made in a multistage process and then blended with the remaining component(s).

The invention thus further provides a "process for producing the random-heterophasic copolymer as defined above" comprising a matrix (A) with at least two fractions (i) and (ii) as defined above, wherein the comonomer content of fraction (i) is lower than the comonomer content of fraction (ii), comprising the steps of:

producing matrix (A) by (a) (co)polymerising in a slurry reactor, e.g. a loop reactor, an alpha-olefin, preferably propylene, and optionally one or more comonomers in the presence of a polymerisation catalyst, to produce fraction (i), transferring the reaction product of step (a) to a subsequent gas phase reactor, (b) copolymerising in a gas phase reactor an alpha-olefin, preferably propylene, with one or more comonomers in the presence of the reaction product of step (a) to produce fraction (ii) for obtaining matrix (A), and then producing rubber component (B) by (c) copolymerising in a subsequent second or further gas phase reactor(s) an al-pha-olefin, preferably propylene, with one or more alpha-olefin comonomers, preferably at least with ethylene, in the presence of matrix (A) obtained from step (b), and recovering the obtained random-heterophasic copolymer.

The process is preferably a continuous process. The comonomer is at least ethylene, more preferably ethylene.

According to one embodiment of the invention the polymerisation conditions for the slurry reactor of the first stage may be as follows:

the temperature is within the range of 40° C. to 110° C., preferably between 60° C. and 90° C., the pressure is within the range of 20 bar to 80 bar, preferably between 30 bar to 60 bar, hydrogen can be added for controlling the molar mass in a manner known per se.

The reaction mixture from the slurry (bulk) reactor is transferred to the first gas phase reactor (second stage). The polymerisation conditions in the first gas phase reactor may be as follows:

the temperature is within the range of 50° C. to 130° C., preferably between 60° C. and 100° C.

the pressure is within the range of 5 bar to 50 bar, preferably between 15-35 bar, in some embodiments also 20 bar to 35 bar may be desired, hydrogen can be added for controlling the molar mass in a manner known per se.

The polymerisation conditions in the subsequent one or more gas phase reactors for preparing rubber component (B), e.g. in the second gas phase reactor in the third stage of the process, can be the same as in the first gas phase reactor of the second stage. Typically, in case of ethylene-propylene, the ratio of ethylene to propylene is 0.1 to 1.5, e.g. 0.3 to 1.0 mol per mol in the reactor.

The process of the invention enables highly feasible means for tailoring matrix (A) of the invention. The properties of the final polymer, i.a. MW, MWD and thus $MFR_2$ and IV (intrinsic viscosity) of matrix (A) and rubber component (B), can be controlled e.g. with one or more of the following process parameters: hydrogen feed, comonomer feed, alpha-olefin feed in the gas phase reactor, preferably propylene and comonomer feeds, catalyst, the type and amount of an external donor (if used), split between fraction (i) and (ii) and the weight ratio of matrix (A) to rubber component (B).

Furthermore, the crystallinity of the random-heterophasic copolymer can be further modified during or after the polymerisation step with nucleating agents in a manner known in the art, e.g. using nucleating systems are described i.a. in WO 9924478 and WO 9924479.

The obtained copolymer product may also be subjected to an extrusion and/or a further treatment steps in a known manner to obtain pellets.

The produced random-heterophasic copolymer of the invention may, if desired, be thus subjected to different treatment steps for further modifying the polymer properties in a known manner, e.g. to a visbreaking, for adjusting, i.e. increasing, the MFR of the product by using conventional methods and organic peroxides.

The random-heterophasic copolymer can be produced by using any suitable polymerisation catalyst.

Preferably, a coordination catalyst is employed, more preferably of the group of transition metals, still more preferably of the transition metals of Group 3 to 10, actinides and lanthanides of the Periodic Table (IUPAC, 1989), such as a Ziegler-Natta-catalyst, a metallocene-catalyst, a non-metallocene-catalyst, or any mixture thereof. Most preferably, Ziegler-Natta catalyst comprising titanium and chlorine is used.

Preferred catalysts are those as disclosed e.g. in U.S. Pat. No. 5,234,879, WO92/19653, WO92/19658, WO99/33843, WO03/000754 and WO03/000757. The documents are included herewith by reference. The preferred catalyst used in the above process is a high activity, stereoselective Ziegler-Natta type polymerisation catalyst system comprising a solid catalyst component, cocatalyst and an external donor. The catalyst may or may not be supported with an external support, e.g. silica. Alternatively, a Mg-based support system may be used.

In one preferred embodiment for producing a heterophasic polymer copolymer as defined above, a procatalyst is used which has been prepared by bringing together MgCl2, a lower alcohol, a titanium compound and an ester of phthalic acid, whereby a transesterification has been carried out at a temperature between 110 and 150° C. between the lower alcohol and the ester of the phthalic acid, whereby the alcoxy group of the phthalic acid ester comprises at least five carbon atoms. Such catalyst is known and can be prepared according or analogously to the literature e.g. as described in U.S. Pat. No. 5,234,879, WO 92/19653, WO92/19658 or WO99/33843 which are included herewith by reference.

In another preferred embodiment a catalyst is used as described in detail below. This catalyst is known in the field and can be prepared according or analogously to the so called emulsion method described e.g. in WO 03/000754 and WO 03/000757. Preferably the catalyst has a low surface area, whereby the catalyst component comprises a compound of a transition metal of Group 3 to 10 of the Periodic Table, or actinide or lanthanide. The most preferred catalysts for this embodiment and their preparation.

The present invention is also related to a random-heterophasic copolymer obtainable by the "process for preparing the random-heterophasic copolymer" as defined above.

According to a first embodiment, the random-heterophasic copolymer is obtainable by the "process for preparing the random-heterophasic copolymer" as defined above using a polymerization catalyst as disclosed in U.S. Pat. No. 5,234,879, WO92/19653, WO92/19658 or WO99/33843.

According to a second embodiment, the random-heterophasic copolymer is obtainable by the "process for preparing the random-heterophasic copolymer" as defined above using a polymerisation catalyst as disclosed in WO 03/000754 or WO 03/000757, which catalyst comprises a compound of a transition metal of Group 3 to 10 of the Periodic Table (IUPAC), or of an actinide or lanthanide, and is prepared according to a "catalyst preparation method" comprising (a) forming a liquid/liquid emulsion system, which contains a homogeneous solution of at least one catalyst component, said solution being dispersed in a solvent immiscible therewith and forming the dispersed phase of the liquid/liquid emulsion system, (b) solidifying said dispersed droplets to form solid catalyst particles having a predetermined size range, (c) removing the solvent from the reaction mixture in order to obtain said solid catalyst particles.

Hence, according to the second embodiment of the "process for preparing the random-heterophasic copolymer" as defined above, the polymerisation catalyst used is a ZN-catalyst which is prepared by the "catalyst preparation method" as defined above.

The invention also provides a random-heterophasic copolymer as defined above which is obtainable by the "process for preparing the random-heterophasic copolymer" as defined above, wherein a polymerisation catalyst is used which is a ZN-catalyst prepared by the "catalyst preparation method" as defined above.

The ZN catalyst which is prepared by the "catalyst preparation method" as defined above enables to produce a random-heterophasic copolymer with very low stiffness. Said catalyst is very suitable for producing a random-heterophasic copolymer of one or more the embodiments (i), (iv) and (vi).

The flexural modulus (stiffness, FM, MPa) can be expressed with the following formula (I) for a specific subgroup (I) of a random-heterophasic propylene copolymer with ethylene as the comonomer:

$$FM = 426 - 22.3 \times C_{2(ii)} + 1.71 \times C_{2AM} - 6.76 \times R + 85.1 \times IV_{AM} \quad (I),$$

wherein:

$C_{2(ii)}$ is ethylene, content in fraction (ii) of matrix (A) in wt %, $C_{2AM}$ is ethylene content in the amorphous part of the random-heterophasic copolymer in wt %, R is the amount (wt %) of rubber component (B), preferably material produced in the second gas phase reactor, based on consumption of ethylene and propylene, given in wt % of the random-heterophasic copolymer, $IV_{AM}$ is the intrinsic viscosity of the amorphous part of the random-heterophasic copolymer in dl/g;

provided that the calculated flexural modulus FM is above 100 MPa, and that the random-heterophasic propylene copolymer has the following combination:
(a) ethylene content in fraction (i) is 4 to 5 wt %,
(b) split between fractions (i) and (ii) is 55/45-65/35 per weight, and
(c) $C_{2(ii)}$ is 4 to 20 wt %, said formula (I) being particularly suitable in the range of 5.5-13 wt %,
(d) $C_{2AM}$ is 15 to 50 wt %, said formula (I) being particularly suitable in the range of 15 to 40 wt %,
(e) R, preferably obtained from $2^{nd}$ gas phase reactor of a multistage process, is 10 to 40 wt %, said formula (I) being particularly suitable in the range of 18 to 35 wt %, and
(f) $IV_{AM}$ is 1.0 to 3.5 dl/g, said formula (I) being particularly suitable in the range of 2 to 3 dl/g.

Furthermore, $MFR_2$ (ISO 1133) is typically 1 to 2 g/10 min, but it is apparent for a skilled person that copolymer compositions with $MFR_2$ higher than 1-2 will also result in very low FM values.

Such subgroup (I) of FM of formula (I) is preferably a subgroup of a random-heterophasic copolymers obtainable by the "process for preparing the random-heterophasic copolymer" as defined above using the ZN polymerisation catalyst that is obtainable by the "catalyst preparation method" as defined above. Moreover, the random-heterophasic copolymer of subgroup (I) has preferably a melting temperature ($T_m$) of at least 130° C.

As to the further definition of the catalyst component, the catalyst, e.g. as described in WO 03/000754, may include, in addition to said transition metal compound, also any additional cocatalyst(s) (e.g. additional transition metal compounds and/or activators and/or poison scavengers and/or any reaction product(s) of a transition compound(s) and a cocatalyst(s). Thus the catalyst may be activated in situ to from the catalyst components in said solution in a manner known in the art.

In one preferable "catalyst preparation method" a solution of a complex of Group 2 metal and an electron donor is prepared by reacting a compound of said metal with said electron donor or a precursor thereof in an organic liquid reaction medium; reacting said complex, in solution, with a compound of a transition metal to produce an emulsion, the dispersed phase of which contains more than 50 mol % of the Group 2 metal in said complex: maintaining the particles of said dispersed phase within the average size of 5 to 200 micrometer by agitation preferably in the presence f an emulsion stabilizer and solidifying said particles.

For said catalyst particles, the compound of a transition metal is preferably a compound of a Group 4 metal. The Group 4 metal is preferably titanium, and its compound to be reacted with the complex of a Gp 2 is preferably a halide. In a still further embodiment of the invention a compound of a transition metal can also be selected from Group 5 metals, Group 6 metals, Cu, Fe, Co, Ni and/or Pd. The complex of the Group 2 metal is preferably a magnesium complex.

In the "catalyst preparation method" also a turbulence minimizing agent (TMA) or mixtures thereof may be used, which are preferably polymers having linear aliphatic carbon backbone chains, which might be branched with short side chains only in order to serve for uniform flow conditions when stirring, Said TMA is in particular preferably selected from α-olefin polymers having a high molecular weight of MW about $1-40 \times 10^6$, or mixtures thereof. Especially preferred are polymers of alpha-olefin monomers with 6 to 20 carbon atoms, and more preferably polyoctene, polynonene, polydecene, polyundecene or polydodecene or mixtures thereof, having the molecular weight and general backbone structure as defined before, and most preferable TMA is polydecene.

As electron donor compound to be reacted with the Group 2 metal compound is preferably a mono- or diester of an aromatic carboxylic acid or diacid, the latter being able to form a chelate-like structured complex. Said aromatic carboxylic acid ester or diester can be formed in situ by reaction of an aromatic carboxylic acid chloride or diacid dichloride with a $C_2$-$C_{16}$ alkanol and/or diol, and is preferable dioctyl phthalate. The reaction for the preparation of the Group 2 metal complex is generally carried out at a temperature of 20° to 80° C. and in case that the Group 2 metal is magnesium, the preparation of the magnesium complex is carried out at a temperature of 50° to 70° C.

The electron donor is preferably an aromatic carboxylic acid ester, a particularly favoured ester being dioctyl (2-ethylhexyl) phthalate. The donor may conveniently be formed in situ by reaction of an aromatic carboxylic acid chloride precursor with a $C_2$-$C_{16}$ alkanol and/or diol. The liquid reaction medium preferably comprises toluene.

The emulsion stabiliser is typically a surfactant, of which the preferred class is that based on acrylic polymers.

The alkoxy magnesium compound group is preferably selected from the group consisting of magnesium dialkoxides, complexes of a magnesium dihalide and an alcohol, and complexes of a magnesium dihalide and a magnesium dialkoxide, it may be a reaction product of an alcohol and a magnesium compound selected from the group consisting of dialkyl magnesiums alkyl magnesium alkoxides, alkyl magnesium halides and magnesium dihalides. It can further be selected from the group consisting of dialkyloxy magnesiums diaryloxy magnesiums alkyloxy magnesium halides, aryloxy magnesium halides, alkyl magnesium alkoxides, aryl magnesium alkoxides and alkyl magnesium aryloxides.

The magnesium dialkoxide may be the reaction product of a magnesium dihalide such as magnesium dichloride or a dialkyl magnesium of the formula $R_2Mg$ wherein each one of the two $R_5$ is a similar or different $C_1$-$C_{20}$ alkyl, preferably a similar or different $C_4$-$C_{10}$ alkyl, Typical magnesium alkyls are ethylbutyl magnesium, dibutyl magnesium, dipropyl magnesium, propylbutyl magnesium, dipentyl magnesium, butylpentylmagnesium, butyloctyl magnesium and dioctyl magnesium. Most preferably, one R of the formula $R_2Mg$ is a butyl group and the other R is an octyl group, i.e. the dialkyl magnesium compound is butyl octyl magnesium.

Typical alkyl-alkoxy magnesium compounds RMgOR, when used, are ethyl magnesium butoxide, butyl magnesium pentoxide octyl magnesium butoxide and octyl magnesium octoxide.

Dialkyl magnesium, alkyl magnesium alkoxide or magnesium dihalide can react with a polyhydric alcohol R'(OH), or a mixture thereof with a monohydric alcohol R'OH.

Typical $C_2$ to $C_6$ polyhydric alcohols may be straight-chain or branched and include ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, and triols such as glycerol, methylol propane and pentareythritol. The polyhydric alcohol can be selected on the basis of the activity and morphology it gives the catalyst component.

The aromatic reaction medium may also contain a monohydric alcohol, which may be straight- or branched-chain. Typical $C_1$-$C_{20}$ monohydric alcohols are methanol, ethanol, n-propanol, iso-propanol, n-butanol, iso-butanol, sec.butanol, tert.butanol, n-amyl alcohol, iso-amyl alcohol, sec-amyl alcohol, tert.amyl alcohol, diethyl carbinol, akt.amyl alcohol, sec.isoamyl alcohol, tert.butyl carbinol. Typical $C_6$-$C_{10}$ monohydric alcohols are hexanol, 2-ethyl-1butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, dilsobutyl carbinol, 1-decanol and 2,7-dimethyl-2-octanol. Typical >$C_{10}$ monohydric alcohols are n-1-undecanol, n-1-dodecanol, n-1-tridecanol, n-1-tetradecanol, n-1-pentadecanol, 1-hexadecanol, n-1-heptadecanol and n-1 octadecanol. The monohydric alcohols may be unsaturated, as long as they do not act as catalyst poisons.

Preferable monohydric alcohols are those of formula R'OH in which R' is a $C_2$-$C_{16}$ alkyl group, most preferably a $C_4$-$C_{12}$ alkyl group, particularly 2-ethyl-1-hexanol.

Preferably, essentially all of the aromatic carboxylic acid ester is a reaction product of a carboxylic acid halide, preferably a dicarboxylic acid dihalide, more preferably an unsaturated α,β-dicarboxylic acid halide, most preferably phthalic acid dichloride, with the monohydric alcohol.

The finally obtained catalyst component is desirably in the form of particles having an average size range of 5 to 200 μm, preferably 10 to 100, more preferably 20 to 50 μm. Especially the catalyst particles obtainable by "the catalyst preparation method" are typically non-porous, i.e. their surface area is very small compared to prior art Ziegler-Natta catalysts supported on an external donor. The surface area of the catalyst used in the present invention may be smaller than 20 m²/g, preferably less than 10 m²/g, and more preferably less than 5 m²/g, and may even be not measurable by normal measurement apparatus. This applies also to the porosity. The active components of the catalysts are evenly distributed thorough the whole catalyst particles.

The catalyst used in the present invention comprises a catalyst component pre-pared as aforesaid, preferably in association with an alkyl aluminium cocatalyst and donors, such as an external donor.

The random-heterophasic copolymer as defined in the present invention can be used in wide variety of end applications, i.a. for molded and extruded articles, films including blown and cast films, fibers without limiting to these.

Depending on the end application various additives and/or other polymer components may be added to the random-heterophasic copolymer in a conventional manner.

Additionally, the present invention provides an article, such as film, which comprises a random-heterophasic copolymer according to this invention.

Preferably, the film modulus (for a film below 200 μm) is 80 to 700 MPa, more preferably 80 to 400 MPa and most preferably 80 to 300 MPa.

DEFINITIONS AND DETERMINATION METHODS

The following definitions for the used terms as well as the determination methods for the characterizing values/parameters used herein to describe the random-heterophasic copolymer of the invention and the properties thereof apply generally for the description part above and for the examples below, unless otherwise stated:

Weight-% is abbreviated as w % or wt-%

The xylene solubles (XS)-fraction contains amorphous polymer chains. It is preferable that fraction (i) has a lower XS-fraction than fraction (ii). Low stiffness and impact strength increases with increasing the fraction of xylene solubles in the fraction (ii) and/or in the rubber component (B).

XS (xylene solubles) and AM (amorphous part) were analyzed by the known method:

2.0 g of polymer was dissolved in 250 ml p-xylene at 135° C. under agitation. After 30±2 minutes the solution was allowed to cool for 15 minutes at ambient temperature and then allowed to settle for 30 minutes at 25±0.5° C. The solution was filtered with filter paper into two 100 ml flasks.

The solution from the first 100 ml vessel was evaporated in nitrogen flow and the residue dried under vacuum at 90° C. until constant weight is reached.

$XS\% = (10 \times ml \times v_0)/(m_0 \times v_1)$, wherein $m_0$=initial polymer amount (g)
$m_1$=weight of residue (g)
$v_0$=initial volume (ml)
$V_1$=volume of analyzed sample (ml)

The solution from the second 100 ml flask was treated with 200 ml of acetone under vigorous stirring. The precipitate was filtered and dried in a vacuum oven at 90° C.

$AM\% = (100 \times m_2 \times v_0)/(m_0 \times v_1)$, wherein $m_0$=initial polymer amount (g)
$m_1$=weight of precipitate (g)
$v_0$=initial volume (ml)
$V_1$=volume of analyzed sample (ml)

The intrinsic viscosity (IV) value is increasing with the molecular weight of a polymer. IV of AM: measured according to ISO 1628.

$MFR_2$: measured according to ISO 1133 (230° C., 2.16 kg load).

Comonomer content (wt %) was determined in a known manner based on Fourier transform infrared spectroscopy (FTIR) determination calibrated with $C^{13}$—NMR.

Multimodality, including bimodality, with respect to the comonomer distribution, is demonstrated herein with the different comonomer content (wt %) between the components of the random-heterophasic copolymer, e.g. between the fractions (i) and (ii) of the matrix (A), which comonomer content is determined using said FTIR method described above.

The optional multimodality, including bimodality, with respect to the molecular weight distribution (MWD) means that the molecular weight profile of e.g. the random copolymer component (A) does not comprise a single peak but instead comprises two or more distinct maxima, a maximum and one or more shoulders centered about different average molecular weights, or in some cases a distinctly broadened curve. The fraction (i) may comprise a higher MW component than fraction (ii), or vice versa. E.g. it is possible to produce the fraction (i) as the HMW component in the preferable loop-gas phase process of the invention and the fraction (ii) in the subsequent gas phase reactor as the LMW component. The MWD can be determined e.g. by using a size exclusion chromatography (SEC) in a manner known in the art.

Thermal properties of polymer was analyzed with a differential scanning calorimeter and according to the method:

Melting temperature $T_m$, crystallization temperature $T_c$, and the degree of crystallinity were measured with Mettler TA820 differential scanning calorimetry (DSC) on 3±0.5 mg samples. Both crystallization and melting curves were obtained during 10° C./min cooling and heating scans between 30° C. and 225° C. Melting and crystallization temperatures were taken as the peaks of endotherms and exotherms. The degree of crystallinity was calculated by comparison with heat of fusion of a perfectly crystalline polypropylene, i.e. 209 J/g.

Instrumental falling weight impact (IFWI): was measured according to ISO 6603-2.

Flexural modulus: was measured according to ISO 178 (room temperature, if not otherwise mentioned) by using injection moulded test specimens as described in EN ISO 1873-2 (80×10×4 mm).

Charpy notched impact: was measured according to ISO 179 (room temperature, if not otherwise informed) and at −20° C. by using injection moulded test specimens as described in EN ISO 1873-2 (80×10×4 mm)

Tensile strength: (tensile stress at yield) was measured according to ISO 572-2 (cross head speed=50 mm/min)

Tensile modulus: was measured according to ISO 572-2 (cross head speed=1 mm/min)

The present invention will now be described by way of examples: The raw materials are e.g. commercially available or can be produced according or analogously to the known methods described in literature, unless otherwise specified.

Example 1

All raw materials were essentially free from water and air and all material additions to the reactor and the different steps were done under inert conditions in a nitrogen atmosphere. The water content in propylene was less than 5 ppm. The polymerisation (bulk polymerisation step) was done in a 5 litre reactor, which was heated, vacuumed and purged with nitrogen before use. 407 µl TEA (triethyl aluminium, from Witco used as received), 69 µl external donor (dicyclo pentyl dimethoxy silane, from Wacker, dried with molecular sieves) and 30 ml pentane (dried with molecular sieves and purged with nitrogen) were mixed and allowed to react for 5 minutes. Half of the mixture was added to the reactor and the other half was mixed with 20.1 mg highly active and stereo specific Ziegler Natta catalyst (ZN catalyst). The ZN catalyst was prepared according to patent WO03/000754, example 7, and had Ti content 2.84 w %. After about 10 minutes the ZN catalyst/TEA/external donor/pentane mixture was added to the reactor. The Al/Ti molar ratio was 250 and the Al/Do molar ratio was 10. 80 mmol hydrogen, and 1400 g were added to the reactor. Ethylene was added continuously during polymerisation and 27 g was added in total. The temperature was increased from room temperature to 70° C. during 18 minutes. The reaction was stopped, after 30 minutes at 70° C. by flashing out unreacted monomer. Finally the polymer powder was taken out from the reactor and analyzed and tested. The MFR of the product (fraction (i) of the matrix (A)) was 2.9, and ethylene content 4.3 w %. The other polymer details are seen in table 1.

Example 2

This example was done in accordance with Example 1, but after having flashed out unreacted propylene after the bulk polymerisation step, the polymerisation was continued in gas phase. After the bulk phase the reactor was pressurized up to 5 bar and purged three times with a 0.042 mol/mol ethylene/propylene mixture. 70 mmol hydrogen was added and the temperature was increased to 70° C. and pressure with the aforementioned ethylene/propylene mixture up to 20 bar during 13 minutes. Consumption of ethylene and propylene was followed from scales. The reaction was allowed to continue until a 60/40 split between polymer amount produced in the bulk stage (fraction (i)) and polymer amount produced in the gas phase (fraction (ii)) was reached. The MFR of the final product was 2.7 and the total ethylene content 5 w %. The ethylene content in the gas phase material can be calculated to be 6.1 w %. Other details are seen in table 1.

Example 3

This example was done in accordance with Example 2. but after having flashed out unreacted monomer after the gas phase polymerisation the polymerisation was continued in the second gas phase (rubber stage). The hydrogen amount in the rubber stage was 120 mmol and ethylene/propylene molar ratio in the feed to the reactor was 0.65. The temperature was 70° C. The reaction was allowed to continue until a rubber content of 20 w %, based on consumption of ethylene and propylene from the scales, in the final product was reached. MFR of the final product was 1.8, the total ethylene content 13.9 w %, XS 28 w %, and flexural stiffness 444 MPa. The other details are shown in table 1.

Example 4

This example was done in accordance with Example 3, with the exception that the reaction was allowed to continue until the rubber content in the final product was 34 w %. MFR of the final product was 1.2, the total ethylene content 19.2 w %, XS 38.6 w %, and flexural stiffness 326 MPa. The other details are shown in table 1.

Example 5

This example was done in accordance with Example 2, with the exception that the ethylene/propylene molar ratio in the feed was 0.084 and hydrogen amount 75 mmol. MFR of the final product was 2.5, the total ethylene content 6.6 w %, and XS 24.3 w %. The ethylene content in the gas phase material can be calculated to be 10.2 w %, The other details are shown in table 1

Example 6

This example was done in accordance with Example 5, but after having flashed out unreacted monomer after the first gas phase stage the reaction was continued in the second gas phase stage. The hydrogen amount was 120 mmol, ethylene/ propylene molar ratio in feed 0.65 and amount of rubber according to mono-mer consumption 20 w %, MFR of the final product was 1.5, the total ethylene content 15.3 w %, XS 34.1 w %, and flexural modulus 327 MPa. The other details are shown in table 1.

Example 7

This example was done in accordance with Example 6, with the exception that the reaction in the rubber stage was allowed to continue until the rubber content in the final product was 34 w %, MFR of the final product was 1.1, the total ethylene content 20.6 w %, XS 43.8 w %, and flexural modulus 240 MPa. The other details are shown in table 1.

Example 8

This example was done in accordance with Example 2, with the exception that the ethylene/propylene molar ratio in the feed was 0.126 and hydrogen amount 80 mmol. MFR of the final product was 2.5, the total ethylene content 7.6 w % and XS 29.5 w %. The ethylene content in the gas phase material can be calculated to be 12.8 w %. The other details are shown in table 1

Example 9

This example was done in accordance with Example 8, but after having flashed out unreacted monomer after the first gas phase stage the reaction was continued in the second gas phase stage. The hydrogen amount was 120 mmol, ethylene/propylene molar ratio 0.65. The reaction was allowed to continue until the rubber content in the final product was 20 w %. MFR of the final product was 1.5, the total ethylene content 16.6%, XS 41.5 w % and flexural modulus 271 MPa. The other details are shown in table 1.

Example 10

This example was done in accordance with Example 9, with the exception that the reaction was allowed to continue until the rubber content in, the final product was 34 w %. MFR of the final product was 1.0, ethylene content 22.2 w %, XS 49.6 w % and flexural modulus 197 MPa. The other details are shown in table 1.

Example 11

This example was done in accordance with Example 10, with the exception that the ethylene/propylene molar ratio in the feed was 0.30 and hydrogen amount 110 mmol. MFR of the final product was 1.3, the total ethylene content 16.0 w %, XS 51.1 w % and flexural modulus 159 MPa.

Example 12

This example was done in accordance with Example 1, with the exception that the catalyst used in this test can be described as a typical 4th generation Ziegler Natta catalyst for producing high isotacticity and high stiffness products. The catalyst was prepared in accordance with WO92/19653. The catalyst contained 2.1 w % titanium. The product produced in bulk contained 4.8 w % ethylene and MFR was 1.8. Other details are shown in table 2.

Example 13

This example was done in accordance with Example 12, but after the bulk stage the polymerisation was continued in gas phase. The temperature was 80° C., hydrogen 60 mmol and ethylene/propylene molar ratio 0.11 in feed. Ethylene content in the product was 6.4 w % MFR 2.4 and XS 20.6 w %. The split between bulk and first gas phase was 50/50. The ethylene content in the gas phase material was 7.7 w %. Other details are seen in table 2.

Example 14

This example was done in accordance with Example 13, but after the first gas phase stage the reaction was continued in the second gas phase stage (rubber stage). The temperature was 70° C., hydrogen 70 mmol and ethylene/propylene molar ratio in feed 0.57. MFR of the final product was 0.80, the total ethylene content 16.4 w %, XS 37.5 w % and flexural modulus 350 MPa. Other details are shown in table 2.

Comparative Example 1

This example was done in accordance with Example 13, except that ethylene/propylene molar ratio in feed was 0.07. MFR of the product was 2.2, ethylene content 5.1 w % and XS 9.9 w %. The split between bulk and first gas phase was 54/46. The ethylene content in the first gas phase material was adjusted to correspond to the ethylene content of the bulk product (within the limits of the measurement accuracy), so that there were no difference in the comonomer contents between the bulk product (fraction i) and the product of the first gas phase reactor (fraction ii) and thus no difference between the ethylene content of the bulk product and the obtained matrix ("one phase matrix"). Other details are seen in table 2.

Comparative Example 2

This example was done in accordance with Comparative Example 1, but after the first gas phase stage the reaction was continued in the second gas phase stage (rubber stage) as described in example 14. MFR of the product was 0.8, ethylene content 14.9 w %, XS 31 w % and flexural modulus 480 MPa.

The experiments of tables 1 and 2 below were made in laboratory scale, thus due to the small-scale measurement accuracy, slight variations in the measured values may occur between individual examples and when compared to the results obtained from the pilot plant experiments shown in below tables 3 to 5.

The examples show the improved combination of the high $T_m$ and low flexural modulus achieved with the present composition comprising "the matrix of two fractions with different comonomer contents". Furthermore, the table 2 shows a comparison between the products of example 14 of the invention and the Comparative example 2 representing the prior art. The product of Comparative example 2 corresponds to that of example 14, except that, although the total ethylene content in the matrix of Comparative example 2 is comparable (within the measurement accuracy) with that of example 14, however there is no difference between the comonomer content of the bulk product (fraction (i)) and the first gas phase product (fraction (ii)) in the matrix of Comparative example 2, and thus no difference between the comonomer content of the bulk product (fraction (i)) and the obtained final product (matrix (A)) thereof. As a result, the product of example 14 has the same melting temperature (about 138° C.), but clearly lower flexular modulus (350 MPa) over that of Comparative example 2 (480 MPa).

Generally, the melting temperature of the random copolymers, preferably ethylene-propylene random copolymers, decreases with increasing comonomer, preferably ethylene, content in case of a matrix of "one phase material". This is also shown by the continuous curve ("one phase material, general") in FIG. 1 using ethylene as the comonomer in the random copolymer. The FIG. 1 shows the different behaviour of the "matrix of two fractions with different comonomer content", wherein the fraction (i) (Bulk material, Ex 1) with lower ethylene content controls the melting temperature of the obtained "two fraction matrix" (Bulk/gas phase material, ex 2, 5 and 8). In Examples 2, 5 and 8 a bulk/gas phase reactor configuration was used.

TABLE 1

Catalyst amount 20.1 mg
Bulk polymerisation: 30 min, 70° C., ethylene feed 27 g

|  |  | Ex 1 | Ex 2 | Ex 3 | Ex 4 | Ex 5 | Ex 6 | Ex 7 | Ex 8 | Ex 9 | Ex 10 | Ex 11 |
|---|---|---|---|---|---|---|---|---|---|---|---|---|
| Bulk polymerisation (fraction i) $1^{st}$ gas phase polymerisation (fraction ii) | | | | | | | | | | | | |
| Time | min | — | 73 | 79 | 80 | 82 | 77 | 78 | 74 | 66 | 69 | 78 |
| Hydrogen | mmol | — | 70 | 70 | 70 | 75 | 75 | 75 | 80 | 80 | 80 | 80 |
| $C_2/C_3$ in feed | mol/mol | — | 0.042 | 0.042 | 0.042 | 0.084 | 0.084 | 0.084 | 0.126 | 0.126 | 0.126 | 0.126 |
| $2^{nd}$ gas phase polymerization (rubber (B)) | | | | | | | | | | | | |
| Time | min | — | — | 43 | 94 | — | 46 | 107 | — | 40 | 119 | 156 |
| Hydrogen | mmol | — | — | 120 | 120 | — | 120 | 120 | — | 120 | 120 | 110 |
| $C_2/C_3$ in feed | mol/mol | — | — | 0.65 | 0.65 | — | 0.65 | 0.65 | — | 0.65 | 0.65 | 0.3 |
| Final Product | | | | | | | | | | | | |
| Yield | g | 331 | 547 | 683 | 833 | 541 | 673 | 817 | 541 | 685 | 823 | 817 |
| MFR2, Powder | g/10 min | 2.9 | 2.7 | 1.8 | 1.2 | 2.5 | 1.5 | 1.1 | 2.5 | 1.5 | 1 | 1.3 |
| Split (bulk/GPR1) | weight ratio | — | 61/39 | 61/39 | 61/39 | 61/39 | 61/39 | 61/39 | 61/39 | 61/39 | 61/39 | 61/39 |
| Split, production in GPR2 | w % | — | — | 20 | 34 | — | 20 | 34 | — | 21 | 34 | 34 |
| $C_2$, | w % | 4.3 | 5 | 13.9 | 19.2 | 6.6 | 15.3 | 20.6 | 7.6 | 16.7 | 22.2 | 16 |
| XS' | w % | 12.1 | 13.4 | 28 | 38.6 | 24.3 | 34.1 | 43.8 | 29.5 | 42 | 49.6 | 51.1 |
| AM | w % | — | 12 | 27.2 | 37.8 | 23 | 33.2 | 43.2 | 28.4 | 41 | 49.1 | 50.7 |
| AM/C2 | w % | — | 23 | 33.7 | 37.6 | 20.5 | 29.2 | 32.3 | 23.8 | 25.9 | 29.7 | 17.9 |
| AM/IV (1) | dl/g | — | — | 2.5 | 2.6 | — | 2.4 | 2.6 | — | 2.4 | 2.7 | 2.4 |
| Tm | ° C. | 141 | 135.7 | 141 | 136.9 | 132.9 | 133.6 | 134.1 | 136.4 | 135.4 | 136.2 | 135.6 |
| Crystallinity | % | 32 | 30 | 32 | 22 | 25 | 21 | 18 | 23 | 19 | 15 | 14 |
| Tcr | ° C. | 101.2 | 96.7 | 101.2 | 96.8 | 94.4 | 92.9 | 92.7 | 97.2 | 92.9 | 94.2 | 94.1 |
| Flexural Modulus, 23° C. | Mpa | | | 444 | 326 | | 327 | 240 | | 271 | 197 | 159 |
| Charpy notched Impact, −20° C. | kJ/m2 | | | 8.4 | x | | 10.3 | x | | 18.2 | x | x |
| IFWI −20° C. | | | | | | | | | | | | |
| Total penetration energy | J | | | 49 | 48 | | 49 | 51 | | 45.6 | 49.8 | 45.9 |
| Type of failure, | | | | ductile | ductile | | ductile | ductile | | ductile | ductile | ductile |
| Flexural Modulus, 23° C., model | MPa | | | 426 | 346 | | 317 | 245 | | 248 | 192 | 146 |
| Difference, Model versus measured | % | | | −4 | +6 | | −3 | +2 | | −9 | −3 | −9 |

(1) from calib. Curve of MW determined using gel permeation cromatograpy, GPC

TABLE 2

Catalyst amount 7.5 mg

|  |  | Ex 12 | Ex 13 | Ex 14 | Comp. Ex 1 | Comp. Ex 2 |
|---|---|---|---|---|---|---|
| Bulk polymerisation $1^{st}$ gas phase polymerisation | | | | | | |
| Time | min | — | 64 | 68 | 65 | 70 |
| Hydrogen | mmol | — | 80 | 80 | 80 | 80 |
| $C_2/C_3$ in feed | mol/mol | — | 0.11 | 0.11 | 0.07 | 0.07 |
| $2^{nd}$ gas phase polymerization | | | | | | |
| Time | min | — | — | 67 | — | 59 |
| Hydrogen | mmol | — | — | 40 | — | 40 |
| $C_2/C_3$ in feed | mol/mol | — | — | 0.57 | — | 0.57 |
| Product | | | | | | |
| Yield | g | 221 | 442 | 615 | 409 | 579 |
| MFR, powder | g/10 min | 1.8 | 2.4 | 0.80 | 2.2 | 0.81 |
| Split (bulk/GPR1) | weight ratio | — | 50/50 | 50/50 | 54/46 | 54/46 |
| Split, production in GPR2 | w % | — | — | 28 | — | 29 |

TABLE 2-continued

| | | Ex 12 | Ex 13 | Ex 14 | Comp. Ex 1 | Comp. Ex 2 |
|---|---|---|---|---|---|---|
| Catalyst amount 7.5 mg | | | | | | |
| $C_2$, (final product) | w % | 4.8 | 6.4 | 16.4 | 5.1 | 14.9 |
| XS | w % | 8.1 | 20.6 | 37.5 | 9.9 | 31 |
| AM | w % | — | — | 38.2 | — | 31 |
| AM/C2 | w % | — | — | 26.3 | — | 26.8 |
| AM/IV (1) | dl/g | — | — | 2.2 | — | 2.5 |
| Tm | ° C. | 144 | 138 | 138 | 136 | 139 |
| Crystallinity | % | 30 | 25 | 21 | 32 | 25 |
| Tcr | ° C. | 101 | 98 | 98 | 93 | 101 |
| Flexural Modulus, 23° C. | Mpa | | | 350 | | 480 |
| IFWI −20° C. | | | | | | |
| Total penetration energy | J | | | 52 | | 53 |
| Type of failure | | | | ductile | | ductile |
| Flexural Modulus, 23° C., model | MPa | | | 347 | | 252 |

(1) from calib. Curve of MW determined using gel permeation cromatograpy, GPC

In the present case, the melting point of the polymer is not controlled by the total ethylene content in the copolymer, but by the ethylene content of the material produced in the bulk. The melting point of the bulk/gas phase materials in this experiment was a few degrees lower than that of the bulk material (the differences may also due to the measurement accuracy, see above), but, in general, the melting point does not decrease markedly with increasing comonomer content. This is because in all three examples the bulk part of the bulk/gas phase material is the same (Example 1). It is only the comonomer, e.g. ethylene, content in the gas phase part that increases. Accordingly, the comonomer, e.g. ethylene, content of fraction (ii) can be increased enabling to increase the total amount of the comonomer, which will increase XS and decrease stiffness (as shown in FIG. 2), while still keeping melting point on an unchanged high level.

As examples show different catalyst can be used for producing the random copolymer of the invention. Furthermore, it was also found, as shown from FIG. 2 that with the catalyst prepared according to the emulsion system described in WO03/000754 ("catalyst preparation method") and used in the examples 1-11 even more decreased stiffness can be obtained for the polymer products compared e.g. to the catalyst described in WO92/19653 and used in examples 12 to 14. The stiffness in the examples 3, 4, 6, 7 and 9-11 with 20 wt % rubber is on the same level as in example 14 with 30 wt % rubber.

Examples 15 to 23

The examples 15 to 23 were prepared in a continuous multistage process in pilot scale comprising a loop reactor and a fluidised bed gas phase reactor as follows: The catalyst used was a known, highly active, stereospecific transesterified $MgCl_2$-supported Ziegler-Natta catalyst prepared according to U.S. Pat. No. 5,234,879. The catalyst was contacted with triethylaluminium (TEAL) as a cocatalyst and an external donor (dicyclopentyl dimethoxysilane). The catalysts used in the examples are further characterized in the tables 3, 4 and 5. The catalyst was prepolymerised in a known manner in the presence of propylene and the cocatalyst in a separate prepolymerisation step. Then propylene, ethylene and hydrogen were fed together with the activated catalyst into the loop reactor which operated as a bulk reactor at conditions given in tables 3 to 5 (production of fraction (i)). Then the polymer slurry stream was fed from the loop reactor into the gas phase reactor and more propylene, ethylene and hydrogen were fed in the gas phase reactor (production of fraction (ii) in the presence of fraction (i) to obtain the matrix (A)). The polymerisation conditions therein are given in tables 3 to 5. The rubber was produced with a C2/C3 ratio 500 mol per kmol and the IV was adjusted with the hydrogen feed.

The products of examples were subjected to visbreaking after the polymerisation of the random-heterophasic copolymer to increase the MFR from 1.5 to 8 g/10 min. The visbreaking was effected in a known manner.

Tables 3, 4 and 5 the properties obtained for the polymer products of examples 15 to 23.

TABLE 3

| Example no. | | 15 | 16 | 17 | 18 |
|---|---|---|---|---|---|
| Sample | | H/R matrix | H/R matrix | H/R matrix | H/R matrix |
| Final product | | | | | |
| MFR, pellets | g/10 min | 7.1 | 7.3 | 7.2 | 8.1 |
| C2 in matrix | w % | 2.1 | 3.5 | 3.5 | 5.1 |
| XS after loop/matrix | w % | 1.6/3.1 | 1.6/10.5 | 1.2/11.5 | 1.2/32.7 |
| Ethene in total copolymer | w % | 7.3 | 8.6 | 14.1 | 14.2 |
| XS produced in the rubber reactor (calculated from the total product) | w % | 14 | 14.2 | 25.5 | 14 |
| XS in total copolymer | w % | 17.2 | 23.7 | 36.9 | 43 |
| IV of AM | dl/g | 1.5 | 1.5 | 1.2 | 1.4 |
| C2 of AM | w % | 30.8 | 18.5 | 32.7 | 24 |
| Tm of PP | ° C. | 162.3 | 162.4 | 162.9 | 162.5 |
| Tcr of PP | ° C. | 126.7 | 127.2 | 126.8 | 126.7 |
| crystallinity | % | 35.6 | 28.9 | 24 | 20.4 |

TABLE 3-continued

| Example no. | | 15 | 16 | 17 | 18 |
|---|---|---|---|---|---|
| Tensile stress at yield | MPa | 23.4 | 19.9 | 14.7 | 12.7 |
| Tensile strain at yield | % | 11.5 | 13.6 | 15.1 | 17.4 |
| Flexural modulus | Mpa | 990 | 750 | 560 | 420 |
| Charpy, notched, at Room Temperature | kJ/m2 | 14.4 | 32 | 61.1 | 63.4 |
| Charpy, notched, at 0 C. | kJ/m2 | 6.2 | 8.1 | 48.2 | 61.7 |
| Charpy, notched, at −20 C. | kJ/m2 | 2.5 | 2.4 | 5.7 | 6.7 |
| HDT, 0.45 Mpa Heat distortion temperature | ° C. | 74 | 66 | 59 | 54 |
| Instrumentated falling weight impact | | | | | |
| at Room Temp. | | | | | |
| Total energy, Etot | J | 37 | 41 | — | 35 |
| type/failure | | ductile | ductile | | ductile |
| at 0 C. | | | | | |
| Total energy, Etot | J | 44 | 51 | — | 42 |
| type/failure | | duct (4) d/br | ductile | | ductile |
| at −20 C. | | | | | |
| Total energy, Etot | J | 18 | 16.5 | 48 | 44 |
| type/failure | | d/br (6) brittle/d-br | brittle | ductile | ductile |
| at −40 C. | | | | | |
| Total energy, Etot | J | — | — | 54 | 45 |
| type/failure | | | | d (9) d/br | d (7) d/br |
| produced in pilot plant: | | | | | |
| Loop temperature | ° C. | 80 | 80 | 80 | 80 |
| MFR, loop | g/10 min | 8.6 | 8.9 | 9.5 | 10.6 |
| split matrix, loop share | % | 60 | 49 | 52 | 47 |
| 1. GPR temperature | ° C. | 85 | 85 | 85 | 85 |
| MFR, matrix | g/10 min | 8.8 | 9.3 | 11 | 12.6 |
| 2. GPR temperature | ° C. | 70 | 70 | 80 | 80 |
| C2/C3 ratio in rubber phase | mol/kmol | 490 | 470 | 570 | 480 |
| C2 after loop/1. GPR/2. GPR (powder) | w % | 0/2.1/6.6 | 0/3.5/8.2 | 0/3.5/13.9 | 0/5.1/13.5 |
| Catalyst | | | | | |
| Al/Ti | mol/mol | 375 | 370 | 410 | 410 |
| external donor, Al/D | mol/mol | 7 | 7 | 7 | 7 |
| Stabilised with; | | | | | |
| CaSt | ppm | 500 | 500 | 500 | 500 |
| Irganox B225 | ppm | 1500 | 1500 | 1500 | 1500 | ductile failure = duct, ductile; brittle failure = brittle, br; ductile/brittle failure = d/br; brittle/ductile failure = br/d.

TABLE 4

| Example | | 19 | 20 | 21 |
|---|---|---|---|---|
| Product name | | H/R matrix | H/R matrix | H/R matrix |
| Final product | | | | |
| MFR2 | g/10 min | 12 | 14 | 9.4 |
| XS after loop/matrix | w % | 1.7/10.5 | 1.7/15.7 | 1.2/10.1 |
| Ethylene in matrix | w % | 3.9 | 4.1 | 3.7 |
| ethylene in all copolymer | w % | 11.3 | 10.8 | 13.3 |
| XS (1) | w % | 22 | 14.6 | 23 |
| XS in total copolymer | w % | 30.5 | 28.4 | 31 |
| Ethylene of AM | w % | 37 | 30 | 35 |
| viscosity of AM | dl/g | 2.5 | 2.4 | 2.7 |
| Tm | ° C. | 164.7 | 164.7 | 164.8 |
| Tcr | ° C. | 117.3 | 117.3 | 119.5 |
| crystallinity | % | 26.6 | 25.1 | 26.3 |
| Tensile stress at yield | MPa | 15.5 | 15.1 | 15.2 |
| Tensile strain at yield | % | 13.4 | 13.8 | 12.8 |
| Elongation of break | % | 670 | 680 | 640 |
| Flexural modulus | MPa | 450 | 450 | 470 |
| Charpy, notched, RT | kJ/m2 | 42.7 | 21.1 | 71.7 |
| Charpy, notched, −20 C. | kJ/m2 | 5.2 | 4.9 | 7.1 |
| Instrumentated falling weight | | | | |
| −20 C. | | | | |
| Total energy, Etot | J | 32 | 32 | 31 |
| type/failure | | ductile | ductile | ductile |

TABLE 4-continued

| Example | | 19 | 20 | 21 |
|---|---|---|---|---|
| Pilot plant polymerisation: | | | | |
| Loop temperature | °C. | 85 | 85 | 85 |
| MFR2 in loop | g/10 min | 31.0 | 35.0 | 115.0 |
| split matrix, loop share | % | 51 | 49 | 49 |
| 1. GPR temperature | °C. | 85 | 85 | 80 |
| MFR2 in matrix | g/10 min | 31.1 | 32.0 | 31.9 |
| 2. GPR temperature | °C. | 80 | 85 | 85 |
| C2/C3 ratio in rubber phase | mol/kmol | 500 | 510 | 500 |
| Al/Ti | mol/mol | 200 | 200 | 200 |
| External donor; Al/D | mol/mol | 10 | 10 | 5 |
| Stabilised with: | | | | |
| CaSt | ppm | 500 | 500 | 500 |
| Irganox B225 | ppm | 1500 | 1500 | 1500 |

(1) produced in the rubber reactor (calculated from the total product)

TABLE 5

| Example no. | | 22 | 23 |
|---|---|---|---|
| Product name | | R/R matrix | R/R-matrix |
| MFR2 (visbroken) | g/10 min | 7.6 | 8.6 |
| XS after loop/matrix | w % | 4.6/25.5 | 7.5/22.9 |
| Ethylene in matrix | w % | 7.0 | 6.8 |
| Ethylene after loop | w % | 2.3 | 4.3 |
| ethylene in all copolymer | w % | 12.6 | 14.4 |
| Rubber composition before visbreaking: | | | |
| XS in rubber phase (calculated) | w % | 20.5 | 20 |
| XS in total copolymer | w % | 41.1 | 39 |
| Ethylene of AM | w % | 20.1 | 22.6 |
| viscosity of AM | dl/g | 1.8 | 1.8 |
| Tm | °C. | 140.7 | 134.6 |
| Tcr | °C. | 101.3 | 100.8 |
| crystallinity | % | 21 | 20.1 |
| Tensile modulus | MPa | 220 | 260 |
| Charpy, notched, RT | kJ/m2 | 72.7 | 71.1 |
| Charpy, notched, −20 C. | kJ/m2 | 8.9 | 6.8 |
| Pilot plant polymerisation: | | | |
| Loop temperature | °C. | 79 | 70 |
| MFR2 in loop | g/10 min | 1.4 | 1.4 |
| split matrix, loop share | % | 41 | 52 |
| 1. GPR temperature | °C. | 85 | 85 |
| MFR2 in matrix | g/10 min | 1.2 | 1.6 |
| 2. GPR temperature | °C. | 80 | 80 |
| C2/C3 ratio in rubber phase | mol/kmol | 470 | 450 |
| MFR in total copolymer | g/10 min | 1.1 | 1.5 |
| Al/Ti | mol/mol | 190 | 330 |
| External donor; Al/D | mol/mol | 9.5 | 14 |
| Stabilised with: | | | |
| CaSt | ppm | — | 500 |
| Irganox B225 | ppm | 1500 | 1500 |
| SHT | ppm | 300 | — |

As already mentioned the invention enables the increase the comonomer content in fraction (ii) of the random PP produced e.g. in a first gas phase reactor, whereby higher ethylene content and higher amount of XS in the final polymer can be achieved, and thus the stiffness (flexural modulus) be decreased, while keeping the melting point essentially in the same level determined by the fraction (i). Furthermore, the stiffness may also be decreased i.a. by means of the amount and/or comonomer content (and thus XS) of the rubber part (B) (e.g. the product of the second or further gas phase reactor) in the final random-heterophasic copolymer composition. Accordingly, in case of example 15, for instance, the increase in the ethylene content in the fraction (ii) (in product of the first gas phase reactor) and/or the increase of the amount and/or XS value of the rubber (B) (the product of the second gas phase reactor) would decrease the flexural modulus further.

As shown in table 5, visbreaking causes a slight decrease in the flexural modulus over the non-visbreaking products enabling the further tailoring of the product.

The invention claimed is:

1. A heterophasic alpha-olefin random copolymer composition comprising
   (a) an alpha-olefin random copolymer component (A) of at least two alpha-olefin copolymer fractions (i) and (ii), and
   (b) a rubber component (B) which is an elastomeric alpha-olefin copolymer, wherein component (A) is a R/R-matrix wherein fraction (i) is a copolymer fraction comprising a copolymer of an alpha-olefin with one or more alpha-olefin comonomers and (ii) is a copolymer; the comonomer content (wt %) of fraction (i) is different from the comonomer content (wt %) of fraction (ii), and the heterophasic alpha-olefin random copolymer composition has a melting temperature ($T_m$) of at least 130° C. but not higher than 155° C., xylene soluble content from 30 to 70 wt %, and a flexural modulus between 100 to 600 MPa.

2. The composition of claim 1 comprising
   (a) an alpha-olefin random copolymer component (A) which comprises at least one fraction (ii) comprising a copolymer of an alpha-olefin with one or more alpha-olefin comonomers, and
   (b) said rubber component (B) dispersed in the random copolymer component (A),
wherein the amount (wt %) of comonomer in fraction (ii) is higher than the amount (wt %) of comonomer in fraction (i).

3. The composition of claim 1, which has a melting temperature ($T_m$) of at least 132° C.

4. The composition of claim 1, which has a melting temperature ($T_m$) of at least 135° C.

5. The composition of claim 1, wherein fraction (i) of component (A) has a melting temperature of at least 130° C.

6. The composition of claim 1, which has a flexural modulus lower than 350 MPa.

7. The composition of claim 1, wherein the difference in the comonomer content between fraction (i) and component (A) is at least 0.5 wt %.

8. The composition of claim 1, wherein the difference in said comonomer content between fraction (i) and component (A) is up to 15 wt %.

9. The composition of claim 1, wherein the difference in said comonomer content between component (A) and the random copolymer fraction (i) is between at least 0.5 wt % and 6 wt %.

10. The composition of claim 1, wherein total amount of the comonomer in component (A), is between at least 1 wt % and 13 wt %.

11. The composition of claim 1, wherein fraction (i) has a comonomer content up to 15 wt %.

12. The composition of claim 1, wherein the amount of the comonomer in fraction (ii) is between 2 to 20 wt %.

13. The composition of claim 1, wherein the α-olefin comonomer content of said rubber component (B) is in the range of 10 to 60 wt %.

14. The composition of claim 1, wherein the weight ratio between fraction (i) and (ii) of component (A) is 30:70 to 70:30.

15. The composition of claim 1, wherein the amount of component (A) in the heterophasic α-olefin random copolymer composition is at least 30 wt % and the amount of rubber (B) is not higher than 70 wt %.

16. The composition of claim 1, wherein the xylene solubles (XS, wt %) of component (A) is up to 50 wt %.

17. The composition of claim 1, wherein the xylene solubles in said rubber component (B) is up to 100 wt %.

18. The composition of claim 1, which is a random-heterophasic propylene copolymer and which comprises
   (a) a propylene random copolymer component (A) comprising at least one fraction (i), which comprises a propylene copolymer with one or more alpha-olefin comonomers, and at least one fraction (ii), which comprises a propylene copolymer with one or more alpha-olefin comonomers, and
   (b) a rubber component (B) of a copolymer of propylene with one or more alpha-olefin comonomers.

19. The composition of claim 1, wherein the comonomer is one or more alpha-olefin selected from the group consisting of ethylene $C_4$ alpha-olefin, $C_5$ alpha-olefin, $C_6$ alpha-olefin, $C_7$ alpha-olefin, $C_8$ alpha-olefin, $C_9$ alpha-olefin, $C_{10}$ alpha-olefin, $C_{11}$ alpha-olefin and $C_{12}$ alpha-olefin.

20. A process for producing the random-heterophasic copolymer as defined in claim 1, comprising: producing component (A) by
   (a) copolymerizing in a slurry reactor an alpha-olefin, and one or more comonomers in the presence of a polymerization catalyst, to produce fraction (i), transferring the reaction product of step (a) to a subsequent gas phase reactor,
   (b) copolymerizing in a gas phase reactor an alpha-olefin, with one or more comonomers in the presence of the reaction product of step (a) to produce fraction (ii) for obtaining component (A),
and then producing rubber component (B) by
   (c) copolymerizing in a subsequent second or further gas phase reactors an alpha-olefin with one or more alpha-olefin comonomers in the presence of component (A) obtained from step (b),
and recovering the obtained random-heterophasic copolymer.

21. The process of claim 20, wherein the polymerization catalyst used in the above process is a high activity, stereoselective Ziegler-Natta type polymerization catalyst comprising a solid catalyst component of a transition metal compound of group 3 to 10 of the Periodic Table (IUPAC, 1989) or of an actinide or lanthanide, cocatalyst and an external donor.

22. A process of claim 20, wherein the polymerization catalyst comprises a compound of a transition metal of Group 3 to 10 of the Periodic Table (IUPAC, 1989), or of an actinide or lanthanide, and is obtained by method comprising
   (a) forming a liquid/liquid emulsion system, which contains a homogeneous solution of at least one catalyst component, said solution being dispersed in a solvent immiscible therewith and forming the dispersed phase of the liquid/liquid emulsion system,
   (b) solidifying said dispersed droplets to form solid catalyst particles having a predetermined size range,
   (c) removing the solvent from the reaction mixture in order to obtain said solid catalyst particles.

23. A random-heterophasic copolymer composition obtained by the process of claim 20.

24. An article comprising the composition of claim 1.

25. An article comprising the composition of claim 23.

* * * * *